United States Patent
Blum

[15] 3,685,926
[45] Aug. 22, 1972

[54] SUBMERSIBLE PUMP ASSEMBLY

[72] Inventor: Albert Blum, Scheiderhohe, Siegkreis, Germany

[22] Filed: Nov. 2, 1970

[21] Appl. No.: 86,198

[52] U.S. Cl....................................417/424, 310/43
[51] Int. Cl. ......F04b 17/00, F04b 35/04, H02k 1/04
[58] Field of Search............417/424, 423, 366, 367; 310/43, 54

[56] References Cited

UNITED STATES PATENTS

| | | | |
|---|---|---|---|
| 2,782,720 | 2/1957 | Dochterman | 310/43 X |
| 3,060,335 | 10/1962 | Greenwald | 310/43 X |
| 3,256,829 | 6/1966 | Schneider | 310/43 X |

*Primary Examiner*—Robert M. Walker
*Attorney*—Lilling and Siegel

[57] ABSTRACT

A submersible electric motor pump assembly for pumping a liquid and having a motor and housing comprising at least the motor stator including the appertaining windings being embedded and totally enclosed in an electrically insulating mass. The mass is provided with heat conducting means insulated electrically from the motor stator for conducting heat from the motor stator and the mass to positions whereby the heat is dissipated by the liquid to be pumped.

14 Claims, 1 Drawing Figure

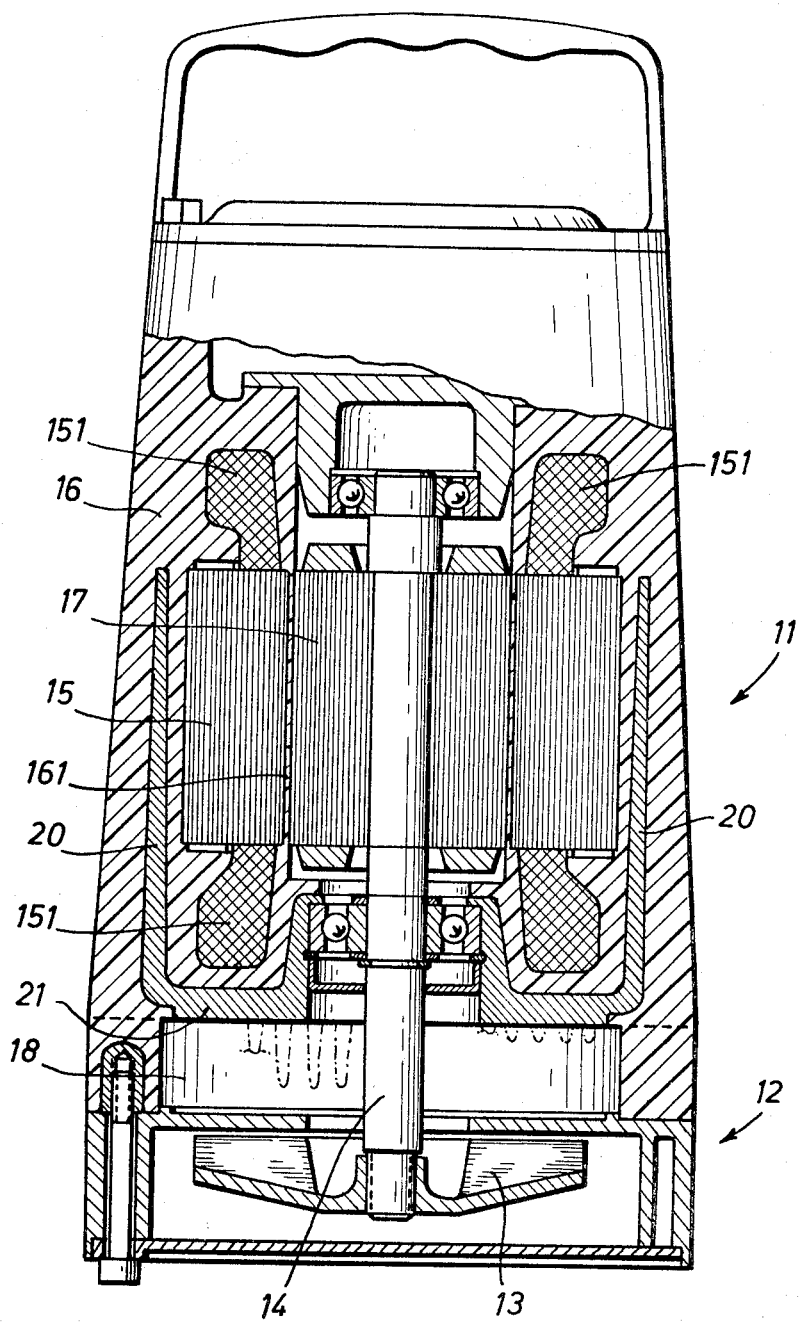

SUBMERSIBLE PUMP ASSEMBLY

BACKGROUND OF THE INVENTION

This invention relates to an electric motor-pump assembly which is submersible in a liquid to be pumped, and the invention is envisaged as being particularly, although not exclusively, useful in relation to such assemblies having centrifugal pump impellers secured directly to the motor shafts.

There have already been many attempts made to achieve complete electrical insulation protection for such submersible pump assemblies, that is to say, to ensure that there exists no possibility of an electrical leakage or short-circuit from parts carrying electric current to parts of the pump housing or to the liquid being pumped. This applies in particular to the stator carrying the field windings of the electric motor.

In the prior art, embedding the stator of the motor completely in an insulating of synthetic plastic material has only been practical with motors of small capacity, because with a higher capacity an adequate dissipation of the heat has been prevented by the mass of synthetic plastic material which also has high heat insulation properties, that is to say its heat conductivity is low. It has therefore been proposed to embed the stator of the electric driving motor to a substantial extent in an insulating medium but to leave the outer periphery at least partially uncovered to that it is possible to provide here a chamber which receives insulating oil or the like s which ensures electrical insulation and at the same time provides for an adequate conduction of the heat away from the stator to the surrounding liquid being pumped. Such an arrangement requires a considerable expenditure which is justifiable only in the case of motors of higher capacity.

The invention is therefore intended mainly to provide an improved submersible electric motor-pump assembly in which the motor is of small or medium capacity and is adequately electrically insulated and cooled.

According to the invention there is provided a submersible electric motor-pump assembly characterized in that at least the motor stator including the appertaining windings is embedded and totally enclosed in a cast or injected or otherwise provided electrically insulating mass in which are heat conducting means insulated electrically from the motor stator for conducting heat from the motor stator and the mass to positions whence the heat is well dissipated by the said liquid. In this way excessive heating of the motor can be prevented.

The said mass preferably consists of synthetic plastic material, and the said heat conducting means preferably includes at least one cylindrical metal insert extending around the stator. The metal insert may be foraminous or perforated or provided with apertures or gaps and it may have ribs or corrugations or be otherwise formed for enlarging its surface area and it may be formed wholly or partially of wire mesh. In an advantageous arrangement the stator and the cylindrical metal insert are co-axial, and the insert may have a portion which is heat dissipating covered by the mass and is cooled by direct contact with the said liquid, for example this portion may constitute an annular cover plate. In a simple and economical construction the cylindrical metal insert is incorporated in an external housing wall which is formed of the said mass and surrounds the motor. The metal insert may be formed with or connected for thermal conduction to a wall or partition portion of the motor housing or pump housing cooled by direct contact with the said liquid, and this portion may be formed with ribs or otherwise shaped for increasing its heat dissipating surface area. Advantageously, the metal insert has a portion which constitutes a mounting for a motor shaft bearing.

BRIEF DESCRIPTION OF THE DRAWING

In the sole figure of the accompanying drawing, a preferred embodiment of an assemblage in accordance with the invention is illustrated by way of example in a side elevational view, partly in section, which shows the important parts of the novel pump.

DESCRIPTION OF THE PREFERRED EMBODIMENT:

The illustrated submersible electric motor-pump assemblage includes an electric driving motor 11 and a pump 12 which is constructed as a centrifugal pump having an impeller 13 arranged directly upon a shaft 14 of the motor 11. The motor 11 comprises a stator 15 around which is moulded or cast a mass 16 of synthetic plastic material which forms the motor housing. This synthetic plastic material mass 16 covers the stator 15 on its inner periphery only in a thin layer 161 which ensures an adequate electrical insulation having regard to the voltage employed and which determines the electrically effective air gap between the stator 15 and a rotor 17 arranged on the motor shaft 14.

On the outer side of the stator 15, which comprises the field winding portions 151 projecting from the stator laminated package and likewise enclosed on all sides by the insulating synthetic plastic material mass 16 is a surrounding cylindrical metal insert 20, which extends all around the stator 15 at a suitable distance therefrom which ensures an adequate security against electrical leakage having regard to the voltage employed. This cylindrical metal insert 20 can be provided in any manner, not illustrated in the drawing, with openings or perforations. At one end it is formed with an annular cover plate 21 which at the same time forms part of a partition wall between the motor and a pump chamber 18 from which the liquid being pumped is discharged. Thereby the annular cover plate 21 is continuously cooled and yields up to the liquid the heat which is conducted to it from the cylindrical metal insert 20, so that this insert 20 is also well cooled. Thus the heat transferred from the stator to the synthetic plastic material mass surrounding it is conducted away through the insert 20 and the cover plate 21 and no excessive heating can occur. In addition to the cover plate 21 the metal insert is formed with a portion which constitutes a mounting for a bearing of the motor shaft 14. Being well supported by the mass 16, the insert 20 may be formed wholly or partially of wire mesh.

For increasing its heat dissipating surface area, the cover plate 21 can be proved on its outer side with cooling fins or the like as indicated in the drawing in chain-dotted lines, and likewise the surface areas of the cylindrical metal insert may be increased.

While I have shown and described preferred embodiments of the invention, there are many changes, modifications, and improvements which may be made

What is claimed is:

1. A submersible electric motor pump assembly for pumping a liquid and having a motor and housing; comprising at least the motor stator including the appertaining windings being embedded and totally enclosed in an electrically insulating mass of synthetic plastic material, said mass having heat conducting means in the form of embedded metallic means disposed about said motor stator and insulated electrically therefrom for conducting heat from said motor stator and said mass to positions whereby the heat is dissipated by the liquid to be pumped.

2. The assembly according to claim 1, wherein said metallic means includes at least one cylindrical metal insert extending around said motor stator.

3. The assembly according to claim 2, wherein said metal insert is foraminous or perforated or provided with apertures or gaps.

4. The assembly according to claim 2, wherein said metal insert is formed so as to enlarge the surface area thereof.

5. The assembly according to claim 4, wherein said metal insert is provided with ribs.

6. The assembly according to claim 2, wherein said metal insert is formed at least in part of wire mesh.

7. The assembly according to claim 2, wherein said motor stator and said metal insert are co-axial.

8. The assembly according to claim 2, wherein said metal insert has a portion which is not covered by said mass and is cooled by direct contact with said liquid to be pumped.

9. The assembly according to claim 2, wherein said metal insert is incorporated in an external housing wall which is formed of said mass and surrounds the motor.

10. The assembly according to claim 2, wherein said metal insert is formed with or connected for thermal conduction to a wall portion of the housing cooled by direct contact with said liquid to be pumped.

11. The assembly according to claim 10, wherein the said wall portion is specially shaped so as to increase its heat dissipating surface area.

12. The assembly according to claim 11, wherein said wall portion is formed with ribs.

13. The assembly according to claim 2, wherein said metal insert has a portion which constitutes a mounting for a motor shaft bearing.

14. The assembly according to claim 1, wherein said electrically insulating mass is casted.

* * * * *